United States Patent Office 3,723,390
Patented Mar. 27, 1973

3,723,390
HIGH PRESSURE CONTINUOUS PROCESS FOR POLYESTERS FROM DICARBOXYLIC ACID ANHYDRIDES AND MONOEPOXIDES
Robert E. Carpenter, Minnetonka, and Curtis R. Peterson, Minneapolis, Minn., assignors to Ashland Oil, Inc., Houston, Tex.
No Drawing. Continuation-in-part of application Ser. No. 664,384, Aug. 30, 1967. This application Oct. 22, 1970, Ser. No. 83,190
Int. Cl. C08g 17/007
U.S. Cl. 260—75 M          12 Claims

ABSTRACT OF THE DISCLOSURE

A process is disclosed for the production of thermoplastic polyester resins via a continuous operation wherein a dicarboxylic acid anhydride and a terminal monoepoxide are condensed under a pressure-temperature-time relationship adapted to efficiently provide products corresponding structurally to conventionally prepared polyesterification products as well as providing unique structurally composed variants thereof.

CROSS-REFERENCE TO A RELATED APPLICATION

This application is a continuation-in-part of application Ser. No. 664,384, filed Aug. 30, 1967 and now abandoned.

BACKGROUND OF THE INVENTION

Field of the invention

This invention relates to a process for the production of thermoplastic polyester resins wherein an anhydride of a dicarboxylic acid is reacted with a lower alkylene oxide.

Description of the prior art

Thermoplastic polyester resins, as such are understood in the resin art, include the class of polyesterification products prepared by reacting a dicarboxylic acid or anhydride with a dihydric alcohol. Polyester resins having polymerizable unsaturation obtained by employing an alpha, beta-ethylenically unsaturated dicarboxylic acid as all or part of the diacid component, when cross-linked with a vinyl monomer, provide thermoset resinous compositions having widespread utility in the laminating, molding and related arts. Saturated polyester resins, on the other hand, are used extensively in plasticizing and adhesive applications, and in the preparation of polyurethane foams and elastomers.

Currently, it is the practice to manufacture the unsaturated as well as the saturated polyester resins commercially by batch operations requiring an extensive period of heating to obtain products exhibiting requisite structural and molecular weight characteristics. Apart from the uneconomical aspect of batch processing, however, the method cannot be faulted, especially in the manufacture of unsaturated polyester resins, as certain inherent features thereof as well as the latitude afforded by raw material selection results in final products advantageously suited for the end uses thereof noted above.

Beginning about the turn of the past decade, an alternate method to the polyesterification procedure was proposed for producing polyester resins. Basically, such method involves the catalytically induced addition or condensation of a lower alkylene oxide with a dicarboxylic acid anhydride in the presence of a compound containing at least one active hydrogen atom. The latter compounds serve a twofold purpose; namely, that of initiating the condensation reaction and controlling the molecular weight characteristics of the resultant polyester product. The prior art which is particularly exemplary of this resinification procedure includes U.S. Pats. Nos. 2,779,-783; 3,254,063; 3,374,208 and 3,382,217.

In addition to the substantial economic advantage residing in the use of an alkylene oxide in place of the corresponding glycol required in carrying out the polyesterification reaction, the aforedescribed addition method for producing polyester resins is also economically attractive from a processing standpoint. The latter is so because the underlying addition reaction is a comparatively rapid mechanism whose apparent rate remains substantially undiminished throughout the course of producing a final product. By comparison, the conventional condensation reaction asymptotically approaches a near zero rate as substantial buildup of molecular weight is achieved. Moreover, the reaction of an alkylene oxide with a diacid anhydride does not generate water as occurs in the conventional batch polyesterification reaction and hence the method is ideally adapted for continuous processing.

Heretofore, the use of alkylene oxides to produce polyester resins, particularly in accordance with a process whereby the condensation reaction is conducted continuously in an integral reactor or processing unit, has not gained commercial acceptance for a variety of reasons. The foremost reason being that the products obtained by the prior art practices lack the structural arrangement of the respective monomeric residues such as is associated with the corresponding polyesterification products. This intrinsic property of the latter type products in turn results in their being superior for use as plasticizers and, more importantly, as reactive resins for cross-linking with a vinyl monomer.

Still another disadvantage of the hitherto proposed ways of implementing the condensation reaction for producing polyester resins is that they fail to achieve substantially complete utilization of the charged alkylene oxide in a brief enough reaction time so as to make a continuous processing operation as aforesaid feasible in a commercial sense. Moreover, the resultant reaction products are prone to contain free anhydride, and when such anhydride is maleic the presence thereof deleteriously affects certain properties of the cross-linked resinous compositions prepared therefrom.

SUMMARY OF THE INVENTION

In accordance with the present invention, a process is provided for the production of polyester resins wherein there is continuously introduced into one end of an elongated reaction zone liquid monomer feeds of a dicarboxylic acid anhydride and a lower alkylene oxide, together with a metal ion catalyst and a reaction initiating and molecular weight controlling amount of an active hydrogen atom containing compounds selected from the group consisting of a polyol, a polycarboxylic acid and water. Said monomer feeds are passed through the reaction zone in the flow pattern exhibiting a minimal degree of back mixing and at the same time subjected to mechanical agitation so as to avoid localized buildup of product on the reaction zone confines and to facilitate a requisite degree of heat-transfer capability. A further essential feature of the invention resides in observing throughout the course of reaction a pressure-temperature relationship concurrently adapted to maintain an essentially liquid-liquid phase condition for the reactants in effecting the reaction of at least 90% of the respective functional equivalents of the monomers introduced into the reaction zone and to provide a product yield of at least about 95% during a residence time of not in excess of about 20 minutes.

One of the principal advantages realized in the practice of this invention is that polyester resins can be produced by a continuous processing operation whereby such resins, from a structural chemical makeup standpoint and absence of unreacted acid anhydride, closely compare to the correspondingly constituted polyester resins prepared via the conventional polyesterification procedure.

Still another important advantage lies in the realization of substantially complete and concomitantly rapid reaction of the alkylene oxide employed to prepare the polyester resin. The latter features combine to make continuous processing of the underlying condensation mode of producing polyester resin commercially applicable.

DESCRIPTION OF THE PREFERRED EMBODIMENTS

Inasmuch as the present invention is directed to an improvement in carrying out the art-known reaction of an alkylene oxide with a diacid anhydride to produce polyester resins, only a brief discussion of the reactants and catalysts applicable for such use will be given before describing the preferred embodiments of the invention. A more exhaustive exemplification of applicable reactants and catalysts can be found in the patents specifically noted hereinabove.

The initiator or reaction starter serves to initiate the ring opening of one molecule of the alkylene oxide or anhydride, thereby facilitating the subsequent chain-like addition of the respective reactants in forming a resultant polymeric unit. Any compound containing at least one active hydrogen group represents a suitable initiator. However, the preferred initiators are the polyols and polycarboxylic acids and especially the various diols and dibasic acids. Water is a pseudo initiator and as such falls within the preferred class of initiators inasmuch as it will react with either the alkylene oxide or diacid anhydride to yield a diol and dicarboxylic acid, respectively. Generally, it is customary to employ as the initiator a glycol corresponding to the alkylene oxide used in preparing the condensation product. In those instances where the glycol or diacid is used, an essentially linear condensate corresponding to the conventional polyesterification product is obtained. For this reason, a diacid anhydride or a glycol, particularly the latter, represent the commonly employed initiators.

Since the initiator is essentially a nucleus or foundation for forming the resultant condensation product, branched thermoplastic condensates can be readily prepared from an initiator containing more than two carboxyl or hydroxyl groups. Thus, a polyol such as trimethylol propane or pentaerythritol serve as nuclei for deriving the aforesaid branch chain type thermoplastic products.

As indicated previously, the intiator likewise controls the molecular weight characteristics of the final product since each condensate or polymer unit derives from one molecule of the initiator. The molecular weight of the final product is primarily dependent upon the weight relationship existing between the selected initiator and the total amount of the particular anhydride and alkylene oxide available for reaction therewith. In light of the foregoing explanation of the role of the initiator, it can be readily appreciated that a generalization of the applicable amounts of initiator to be used in terms of weight percentages is not particularly apt. Where, however, one desires to prepare polyesters corresponding in linearity and molecular weight characteristics to the conventional polyesterification products, then it can be stated that the amount of a $C_2$–$C_4$ glycol or diacid initiator will range from about 1 to 6% based on the combined weight of alkylene oxide and the dicarboxylic acid anhydride.

A variety of dicarboxylic acid anhydrides are available for preparing polyester resins in accordance with this invention. The unsaturated polyester resins are generally obtained using maleic anhydride or a mixture thereof with a saturated diacid anhydride. Representative of applicable saturated diacid anhydrides are such as o-phthalic anhydride, succinic anhydride, polyadipic anhydride, etc. Frequently, a halogenated anhydride, e.g., chlorendic anhydride, is employed as part or all of the saturated diacid anhydride in order to impart fire retardancy properties to cross-link products prepared from the polyester resins. Similarly, other diacid anhydrides can be incorporated into the resinous structure to achieve certain properties for specific end-use purposes.

The alkylene oxides which are especially suited for preparing polyester resins via the condensation reaction include the unsubstituted $C_2$–$C_4$ alkylene-1,2-epoxides. Such alkylene oxides are ethylene oxide and the vicinal oxides of propylene and butylene, of which propylene oxide is particularly preferred. Mixtures of these alkylene oxides can, of course, be used.

A catalyst is necessary in order to effect the addition polymerization of the reactants. Essentially all metal ions exhibit a catalytic function; however, among the more effective catalysts there are the alkali metals, the alkaline earth metals and the metals of Group II–B of the Periodic Table. For the purpose of obtaining optimum product color together with a high level of catalytic effectiveness, the metals whose salts are Lewis acids are especially useful. A particularly applicable metal of this type is zinc. Zinc, in the form of a salt of a $C_2$–$C_{18}$ monocarboxylic acid or of a mineral acid represent the preferred catalysts. The amount of the preferred catalysts can be from about 0.01–.5% by weight, based on the weight of the alkylene oxide and dicarboxylic acid anhydride.

In carrying out the present invention, all of the monomer feed of the dicarboxylic acid anhydride in liquid form is introduced at one end of an elongated reaction zone. Similarly introduced at this situs is the metal ion catalyst and the initiator. All or part of the alkylene oxide can be fed to the reaction zone at such point. The alkylene oxide is likewise added as a liquid feed thereof. The mode of introduction of alkylene oxide, i.e., whether it is added initially in toto or in aliquot portions at spaced intervals along the overall effective length of the reation zone, are processing variants largely governing the type of resinous structure exhibited by the final product. For example, if all of the alkylene oxide is added initially, there is a pronounced tendency for the alkylene oxide to homopolymerize and thus provide polymers having a markedly high content of tri- and tetraoxyalkylene segments within the polymer chain. On the other hand, if the alkylene oxide is added incrementally at spaced intervals, the oxyalkylene residues distribution of the resultant product shifts to one comprising mainly mono-, di- and trioxyalkylene segments. Accordingly, a particular mode of alkylene oxide introduction can be selected to provide polymers having a closely similar structurally arrangement in this respect to polyesterification products prepared via the conventional batch processing condensation polymerization method.

In the manufacture of the conventional esterification products from a dicarboxylic acid and glycol, the excess of hydroxyl groups over the carboxyl groups initially present primarily governs the molecular weight characteristics of the final product at specified final acid number or hydroxyl number. This concept, however, does not apply as strictly to polyester resins prepared by reacting an alkylene oxide with a dicarboxylic acid anhydride. This is so because the addition reaction can lead to an extensive amount of homo-addition of the alkylene oxide which far exceeds the extent of polyetherification that will occur in a conventional batch operation. Thus, in the practice of the present invention, the monomer feed of alkylene oxide in relation to that of the dicarboxylic acid anhydride can be regulated so as to provide within the reaction zone an external equivalent ratio of carboxyl groups to hydroxyl groups ranging broadly from about 1:0.9 to 1:4, respectively. In the preparation of unsaturated polyesters, however, the preferred equivalent ratio of carboxy groups to hydroxy groups is between about 1:1.2 and 1:2. The term "external" refers to the overall equivalent ratio of such groups that exist within the reaction zone at any given time. Obviously, the equivalent ratio may vary within the reaction zone proper depending upon whether or not the alkylene oxide is introduced into the reaction zone incrementally or otherwise.

In effecting the condensation of a diacid anhydride with an alkylene oxide in accordance with this invention, a pressure-temperature relationship must be observed to insure a liquid-liquid phase condition for the stated reactants at all times. The reaction temperature principally governs the rate by which the reactants will condense in forming the polyester product. A broadly applicable temperature range is from about 340–500° F. The preferred temperature range is between about 360 and 425° F. Pressure, besides enhancing the reaction rate also beneficially influences the molecular weight distribution characteristics of the polyester product and, furthermore, importantly contributes toward the realization of the minimum yields contemplated in the practice of this invention, i.e., monomer conversion yield and product yield. In order to achieve the foregoing effects of pressure, it is necessary to conduct the condensation reaction under a superimposed or otherwise provided-for pressure of at least 350 p.s.i.g., keeping in mind, of course, that an appropriate reaction temperature is to be selected which results in a liquid-liquid phase condition for the reactants. The preferred pressure ranges from about 400–500 p.s.i.g.

The process of this invention is carried out under the processing conditions aforedescribed for a sufficient length of time to obtain a polyester product meeting a minimum yield requirement with respect to monomer conversion and product formation. Product yield refers to the avoirdupois percentage ratio the polyester product bears to the reactants employed to prepare the product. The minimum product yield is about 95%. More preferably, however, such yield is in the order of 98%. The monomer conversion yield on the other hand is indicative of the extent of resinification occurring in the condensation reaction. Monomer conversion yield refers to the percentage ratio the sum total equivalents of carboxy and hydroxy groups associated with 100 parts by weight of the polyester product bears to the sum total of carboxy and hydroxy equivalents contained by 100 parts by weight of the reactants. In ascertaining either monomer conversion or product yield, the initiator is taken into account as a reactant. In light of the objectives of the present invention, the monomer conversion yield should be at least 90%. The minimum conversion yield in the case of unsaturated polyesters having optimum properties is desirably in the order of about 95%.

Time for accomplishing the reaction in achieving the yield conditions noted above has a bearing on the properties of the resultant polyester product rather than being simply an abstract processing parameter. Accordingly, it is desirable to observe a reaction time not in excess of 20 minutes since a longer period of reaction will adversely affect color and in the case of unsaturated polyesters will lead to an objectionable degree of viscosity buildup due to the incipient gelation tendency characteristic of such resins. In context of the preferred temperature-pressure conditions contemplated for carrying out the present invention, the corresponding reaction time should preferably be not in excess of about 10 minutes and usually will range from about 3 to 7 minutes.

As indicated, an elongated reaction zone is contemplated for the purpose of effecting the condensation reaction. Such a reaction zone can take various forms of which a tubular pipe equipped with an agitator represents the simplest and reasonably satisfactory type. Due, however, to the difficulty of maintaining a constant pressure within such type of reactor and the mechanical problems associated with agitating the reactants therein to avoid undesirable back mixing among other disadvantages, the use of a multistage reactor is preferred.

There are commercial multistage reactors that are ideally suited for effecting the co-current flow of the reactants therethrough while at the same time providing excellent mixing and heat-transfer capability and provisions for achieving the incremental addition of the alkyene oxide without experiencing the channeling and back mixing thereof as is faced in utilizing a one-stage reactor such as a unrestricted tubular device. An exemplary multistage reactor design is one consisting of a series of circular sections, each of which is a separate individual chamber for mixing and reacting. Each section or chamber contains a rotating impeller, both faces of which are adjacent to stationary heat transfer plates with close mechanical clearances in the order of several mils and having its periphery enclosed in a stationary cylinder with relatively close clearance between the inside cylinder wall and the periphery of the impeller.

In the operation of such a reactor, the monomer feeds to the initial inlet port enters the first chamber wherein the monomer feeds flow between the taper on the end of the shaft and a tapered bore in the head plate. The reactants then travel radially outward on one side of the impeller over an impeller baffle disc and down the other side of the impeller toward the center of the unit. The flow continues through the bore in the adjacent downstream heat transfer plate, up one side of the next impeller radially toward the periphery, over the baffle disc and down toward the center. This predetermined flow pattern is continued to the last stage where the product leaves the reactor via an outlet port.

In operation of a multistage reactor as generally described above, the selected pressure can be conveniently controlled by positive displacement feed pumps acting in conjunction with a common flow control valve. The residence time of the reactants within the series of chambers or stages is governed by the rates at which the various reactants are introduced.

In an addition reaction of the type herein concerned, the alkylene oxide reacts in a rapid fashion with the dicarboxylic acid anhydride to produce a polyester resin product. Thus, only a minor amount of isomerization, e.g., from about 25–35%, of any starting maleic anhydride occurs in the ensuing reaction. In contrast, due to the long period of heating experienced in the conventional polyesterification reaction, substantially complete isomerization of any maleic anhydride present will be accomplished in situ during the course of the reaction. Reactive polyester resins having a high fumarate content are especially desirable since such resins when cross-linked with styrene provide thermoset products having superior physical properties. Converting a polyester resin having a high maleate content to one having a corresponding high fumarate content presents no problem as there are a number of isomerization catalysts available to achieve from a major to a substantially complete degree of conversion in a nominal period of heating. Generally, catalytic isomerization of this type is effected at a temperature of from about 200–260° C. Operating within the foregoing temperature range, the time required for accomplishing a substantial to a complete degree of isomerization ranges from about 3 to 20 minutes.

In order to illustrate to those skilled in the art the best mode contemplated for carrying out the present invention, the following specific examples are set forth. Obviously, the processing conditions and reactants can be varied extensively from those shown in these examples pursuant to the general teachings outlined above. Accordingly, it is to be understood that any enumeration of details contained in the following examples should not be construed as a limitation on the invention except as such limitations appear in the appended claims. All parts are parts by weight unless otherwise indicated.

EXAMPLE I

In this example there is described a method in accordance with this invention for preparing a reactive polyester resin which is especially suited for use in the bulk molding technique. In the latter type application, a solution of the polyester resin in styrene is combined with a filler and curing agent to form a dough which is then cured in a press mold.

The formula for the polyester resin product of this example is as follows:

| Reactant: | Wt. percent |
|---|---|
| Maleic anhydride (A) | 50.76 |
| Propylene oxide (B) | 45.10 |
| Propylene glycol (C) | 3.94 |
| Zinc acetate dihydrate (D) | 0.20 |
| | 100.00 |

The polyester resin pilot-plant run of this example was conducted continuously for about 400 hours to produce a total of approximately 6,000 pounds of resin. The reactor employed was a commercially available five-stage continuous reactor such as generally described hereinabove. The effective reactor volume was 45.7 cubic inches. The production rate of product was 0.442 pound per minute throughout the course of the run. All of the maleic anhydride in molten form was fed from nitrogen blanketed holding vessel to the first zone of the reactor using a conventional piston type pump. The initiator and catalyst were combined to provide a homogenous mix which then was likewise pumped into the first zone. The liquified propylene oxide reactant was pumped at equal rates into each of the first two reaction zones employing a diaphragm pump. A product flow control valve was automatically regulated to ensure a constant overall bulk residence time of 3.75 minutes and a pressure of 400 p.s.i.g. in each reaction zone. The reactants entering the first reaction zone were quickly brought up to operating temperature through the use of a strip heater applied to the first reaction zone. Cooling of the subsequent zones was accomplished by blowing air through the heat transfer zones residing between the respective reaction zones. The reaction temperature profile existing throughout the five reaction zones, together with a summary of the flow rates of reactants and/or product within the various reaction zones is shown in the following Table I.

TABLE I

| Reactor zone | 1 | 2 | 3 | 4 | 5 |
|---|---|---|---|---|---|
| Rx temp. out (° F.) | 448 | 448 | 437 | 432 | 422 |
| Rx temp. in (° F.) | 170 | 363 | 448 | 437 | 432 |
| Reactants flow rates:[1] | | | | | |
| A | 101.52 | | | | |
| C+D | 8.28 | | | | |
| B | 45.1 | 45.1 | | | |
| Product | | 154.9 | 200 | 200 | 200 |
| Total | 154.9 | 200 | 200 | 200 | 200 |

[1] Grams per minute.

The polyester resin product had a composite acid number of 22.2 and a hydroxyl number of 30.8, indicating a monomer conversion yield of 97%. A material balance showed that the overall product yield was 95%.

The effluent from the reactor was continuously isomerized in the presence of 2% morpholine catalyst at 410° F. The residence time for effecting isomerization was 14 minutes. The isomerization procedure converted the reactor effluent exhibiting a 25% fumarate content and a 75% maleate content to one having a 70% fumaric content and 30% maleic content. The isomerized resin was continuously thinned to provide a polyester resinous composition containing 25% styrene and 75% of the polyester resin. Pertinent properties of the resin solution were as follows:

| | |
|---|---|
| Viscosity at 77° F., cps. | 3600 |
| Color, Gardner | 3–4 |
| SPI gel time, min. | 5.5 |
| Gel to Peak, min. | 2.5 |
| Peak exotherm ° F. | 436 |

One-eighth inch thick unfilled castings and appropriately sized for conducting the physical property tests noted below were prepared from the polyester resinous composition using as the curing catalyst 1% benzoyl peroxide. The properties of the cast resin specimens were as follows:

| | |
|---|---|
| Tensile strength, p.s.i. (ASTM–D638) | 3,900 |
| Tensile modulus, p.s.i. (ASTM–D638) | $3.9 \times 10^5$ |
| Tensile elongation, percent (ASTM–D638) | 1.1 |
| Flexural strength, p.s.i. (ASTM–D790) | 10,120 |
| Flexural modulus, p.s.i. (ASTM–D790) | $4.4 \times 10^5$ |
| Heat distortion temp., ° C. | 72 |
| Barcol hardness | 46 |

EXAMPLE II

In this example, a polyester resin was prepared having specialized utility in a preforming type molding application as conventionally observed in the fabrication of contoured chairs and molded objects of like intricate design. The formula for the polyester resin concerned is as follows:

| Reactant: | Wt. percent |
|---|---|
| Maleic anhydride (A) | 29.44 |
| Phthalic anhydride (B) | 29.66 |
| Propylene oxide (C) | 35.31 |
| Propylene glycol (D) | 4.37 |
| Magnesium carbonate (E) | 0.22 |

The reactor of Example I was used to prepare 1000 lbs. of the polyester resin. Bulk residence time and pressure were identical to those parameters observed in Example I. The anhydrides in the proportions noted above were fed in molten form into the first reaction zone. The propylene oxide was proportioned into the initial three reaction zones in equal amounts. The reaction temperature profile existing throughout the five reaction zones, together with the flow rates of reactant and/or product within the various reaction zones is shown in the following Table II.

TABLE II

| Reaction zone | 1 | 2 | 3 | 4 | 5 |
|---|---|---|---|---|---|
| Rx temp. out (° F.) | 440 | 445 | 425 | 415 | 400 |
| Rx temp. in (° F.) | 430 | 430 | 415 | 400 | 395 |
| Reactants flow rates:[1] | | | | | |
| A+B | 118.2 | | | | |
| D+E | 9.1 | | | | |
| C | 24.2 | 24.2 | 24.2 | | |
| Product | | 151.6 | 175.8 | 200 | 200 |
| Total | 151.6 | 175.8 | 220 | 200 | 200 |

[1] Grams per minute.

The polyester resin product had a composite acid number of 16.4 and a hydroxyl number of 38.5, indicating a monomer conversion yield of 97%. The overall product yield was 98%.

The reactor effluent analyzing (NMR) 25% fumarate content and 75% maleate content was isomerized under the conditions noted in Example I. The isomerized product exhibited a fumarate content of 74% and a maleate content of 26%. The isomerized product was continuously thinned with styrene to provide a solution containing 29±1% resin solids. Pertinent properties of the resin solution were as follows:

| | |
|---|---|
| Viscosity at 77° F., cps. | 2,260 |
| Color, Gardner | 5–6 |
| SPI gel time, min. | 8.0 |
| Gel to peak, min. | 2.4 |
| Peak exotherm ° F. | 426 |

Castings were prepared and tested in the manner indicated in Example I. Results of these tests were as follows:

| | |
|---|---|
| Tensile strength, p.s.i. | 5,700 |
| Tensile modulus, p.s.i. | $5.5 \times 10^5$ |
| Tensile elongation, percent | 1.2 |
| Flexural strength, p.s.i. | 11,800 |
| Flexural modulus, p.s.i. | $6.1 \times 10^5$ |
| Heat distortion temp. °C. | 90 |
| Barcol hardness | 50 |

What is claimed is:

1. A process for the production of thermoplastic polyester resins which comprises:

continuously introducing into one end of an elongated reaction zone maintained at a temperature of from about 340–500° F. and at a pressure of at least 350 p.s.i.g., a liquid monomer feed of an anhydride of a dicarboxylic acid, together with a metal ion catalyst and a reaction initiating and molecular weight controlling amount of an active hydrogen atom containing compound selected from the group consisting of a polyol, a polycarboxylic acid and water;

continuously introducing a liquid monomer feed of a unsubstituted $C_2$–$C_4$ alkylene-1,2-epoxide or a mixture thereof at a plurality of spaced intervals along the effective length of the reaction zone, said monomer feeds being introduced into the reaction zone in relative amounts so as to provide therein an external equivalent ratio of carboxyl groups to hydroxyl groups of from about 1:0.9 to 1:4, respectively;

effecting essentially co-current flow of the reactants under essentially liquid-liquid phase conditions within said reaction zone while mechanically agitating the reactants to avoid localized buildup of condensation product on the reaction zone confines; and regulating the introduction flow rates of said monomer feeds so as to result in a residence time within the reaction zone sufficient to provide a product yield of at least 98% and to effect the reaction of at least about 95% of said monomers on an equivalent basis but not to exceed about 20 minutes.

2. A process in accordance with claim 1 for the production of unsaturated polyester resins wherein said dicarboxylic anhydride is an anhydride of an alpha, beta-ethylenically unsaturated dicarboxylic acid or a mixture thereof with a saturated dicarboxylic acid anhydride and wherein the monomer feeds are introduced into the reaction zone in relative amounts so as to provide therein an external equivalent ratio of carboxyl groups to hydroxyl groups of from about 1:1.2 to 1:2, respectively.

3. A process in accordance with claim 2 wherein said unsubstituted alkylene-1,2-epoxide is propylene oxide.

4. A process in accordance with claim 3 wherein said reaction initiator is a lower alkylene glycol.

5. A process in accordance with claim 4 wherein said reaction zone is maintained at a temperature of from about 360–425° F. and at a pressure between about 400 and 500 p.s.i.g., and whereby the introduction flow rates of said monomer feeds are regulated so as to result in a residence time within the reaction zone of not in excess of about 10 minutes.

6. A process in accordance with claim 5 wherein said alpha,beta-ethylenically unsaturated dicarboxylic acid anhydride is maleic anhydride and said unsaturated dicarboxylic acid anhydride is phthalic anhydride.

7. A process in accordance with claim 6 wherein said metal ion catalyst is a zinc compound.

8. A process in accordance with claim 7 wherein said zinc compound is zinc chloride.

9. A process in accordance with claim 8 wherein said monomer feed of a dicarboxylic acid anhydride consists essentially of maleic anhydride.

10. A process in accordance with claim 9 wherein said reaction initiator is propylene glycol.

11. A process in accordance with claim 8 wherein said monomer feed of a dicarboxylic acid anhydride consists essentially of a mixture of maleic anhydride and phthalic anhydride.

12. A process in accordance with claim 11 wherein said reaction initiator is propylene glycol.

References Cited

UNITED STATES PATENTS

| | | |
|---|---|---|
| 3,067,179 | 12/1962 | Frey. |
| 3,213,067 | 10/1965 | Pohl et al. |
| 3,254,060 | 5/1966 | Connolly et al. |
| 3,355,408 | 11/1967 | Mayer et al. |
| 3,374,208 | 3/1968 | Seiner et al. |
| 3,375,301 | 3/1968 | Case et al. |
| 3,376,273 | 4/1968 | Masters et al. |
| 3,382,217 | 5/1968 | Case _____ 260—78.4 |
| 3,390,135 | 6/1968 | Seiner. |

OTHER REFERENCES

Boenig: Unsaturated Polyesters, Elsevier, New York, 1964, pp. 35–36, 102–05.

MELVIN GOLDSTEIN, Primary Examiner

U.S. Cl. X.R.

260—75 EP